| United States Patent [19] | [11] Patent Number: 4,753,858 |
| Jow | [45] Date of Patent: Jun. 28, 1988 |

| [54] | RECHARGEABLE SODIUM ALLOY ANODE |
|------|---|
| [75] | Inventor: Taiguang R. Jow, Chatham Township, Morris County, N.J. |
| [73] | Assignee: Allied-Signal Inc., Morris Township, Morris County, N.J. |
| [21] | Appl. No.: 756,858 |
| [22] | Filed: Jul. 18, 1985 |
| [51] | Int. Cl.⁴ .................. H01M 6/14; H01M 4/58 |
| [52] | U.S. Cl. ................................. 429/194; 429/218 |
| [58] | Field of Search .............................. 429/218, 194 |

[56] References Cited

U.S. PATENT DOCUMENTS

| 3,413,154 | 11/1968 | Rao | 429/194 |
| 3,508,967 | 4/1970 | Lyall et al. | 429/217 |
| 4,436,796 | 3/1984 | Huggins et al. | 429/218 X |
| 4,495,258 | 1/1985 | LeMehaute et al. | 429/194 X |

FOREIGN PATENT DOCUMENTS 2257723  5/1973  Fed. Rep. of Germany ...... 429/194

*Primary Examiner*—Brian E. Hearn
*Assistant Examiner*—S. J. Kalafut
*Attorney, Agent, or Firm*—Richard C. Stewart, II; Gerhard H. Fuchs

[57] ABSTRACT

This invention relates to a novel anode for use in batteries, and to batteries containing the anode, which anode comprises an alloy sodium.

10 Claims, No Drawings

RECHARGEABLE SODIUM ALLOY ANODE

BACKGROUND OF THE INVENTION (1) Field of the Invention

This invention relates to rechargeable electrochemical cells. More particularly, this invention relates to such cells in which the anode comprises an alloy of sodium and one or more other metallic and non-metallic elements.

(2) Prior Art

Lithium and lithium alloys have been suggested for use as the negative electrode of electrochemical cells. For example, U.S. Pat. No. 4,002,492 discloses elecrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), and Bensenhard, *J. Electroanal. Chem.*, 94, 77 (1978). European Pat. No. 0070107; Murphy et al., *J. Electrochem. Soc.*, 126, 349 (1979) and Murphy et al., *Mat. Res. Bull.*, 13, 1395 (1978) disclose batteries based on lithium and sodium intercalation in layered dichalcogenides.

In J. O. Besenhard and G. Eichinger, J. Electroanal. Chem., 78, I (1976), at pages 8 and 9 describe the difficulty of redepositing sodium metal at room temperature from non-aqueous solutions.

SUMMARY OF THE INVENTION

The present invention provides an improved electrochemical cell which comprises an anode, having an anode active material, a cathode having cathode active material and a non-aqueous electrolyte having an ionic salt of the anode active material dissolved therein, the improvement comprising an anode which consists essentially of an alloy of sodium. Several advantages flow from this invention. For example, use of the sodium alloy allows the use of sodium (which is inexpensive and abundant) as the anode active material in a secondary battery even though sodium is normally difficult to plate and strip in non-aqueous electrolytes. The commonly observed failure mode of the secondary batteries which arises from the dendritic growth of the anode which shorts the cell when plating the active anode material back to anode is avoided by alloy formation. The lower activities of the Na alloy also provide greater stabilities than that of pure Na and Li, and Li alloys in the electrolyte media which greatly improves its rechargeability. Moreover, sodium forms intermetallic compounds or alloys with high sodium content, as for example, $Na_5Pb_2$, $Na_{15}Pb_4$, $Na_5Sn_2$, and $Na_{15}Sn_4$ which provides for higher discharge capacities.

DESCRIPTION OF THE PREFERRED EMBODIMENTS

As an essential component, the electrochemical cell of this invention includes an anode consisting essentially of an alloy of sodium. The type of sodium alloy employed is not critical and can vary widely. Such alloys can be binary, ternary or can contain more than three components. The other component or components can be metallic or non-metallic. Illustrative of alloys which are useful in the conduct of this invention are binary sodium alloys such as sodium alloys of tin, lead, silicon, antimony, bismuth, tellurium, thallium, selenium, gold, cadmium, arsenic, mercury, cesium, gallium, and the like. Also illustrative of useful alloys are ternary sodium alloys such as sodium alloys of tin and lead, antimony and lead, selenium and tellurium, and the like. Useful alloys include quaternary alloys such as sodium alloys of lead, tin and bismuth.

Preferred for use in the practice of this invention are sodium alloys in which the other component or components are metals. Particularly preferred for use in the practice of this invention are alloys of sodium and one or more metals selected from the group consisting of tin, lead, antimony, bismuth, selenium, tellerium, mercury and cadmium. Amongst these particularly preferred embodiments, most preferred are ternary or binary alloys of sodium, and tin, lead, bismuth and/or antimony.

The mole ratios of the components of the alloy can vary widely, depending on permissible ratios based on allowed interactions between the components and the desired capacity of the anode. In general, since sodium is the electroactive material in the anode, the greater the mole percent of sodium in the anode, the greater the capacity of the anode; and conversely, the lower the mole ratio of sodium in the anode, the lower the capacity. In general, since higher capacities are desirable, higher amounts of sodium in the alloy are desirable. Sodium as compared to lithium is readily adaptable to providing such high capacity anodes because it can form intermetallic compounds or alloys such as $Na_5Pb_2$, $Na_{15}Pb_4$, $Na_5Sn_2$, and $Na_{15}Sn_4$, which have higher sodium content. In the preferred embodiments of the invention, the mole ratio of sodium to other components in the alloy is about equal to or greater than about 0.5 to 1. In these preferred embodiments, the upper amount of sodium in the alloy is the greatest amount of sodium which can be alloyed with the other component or components before pure metallic, un-alloyed sodium is formed. In the particularly preferred embodiments of the invention, the mole ratio of sodium to the other components in the alloy will usually vary from about 1 to about 1, to about 5 to about 1, and in the most preferred embodiments will vary from about 4 to about 1, to about 1 to about 1.

The method of manufacturing the alloy is not critical and can vary widely. Conventional alloying procedures are readily adaptable for use in the practice of this invention. For example, such alloys can be formed electrochemically by plating sodium onto a substrate of the other components as described in more detail in N. N. Tomashova, I. G. Kieseleva and B. N. Kabanov, *Elektrokhimiya*, vol 8, p112 (1972) which is incorporated herein by reference. Sodium alloys can also be prepared metallurgically by melting appropriate amounts of sodium and the other components in an inert atmosphere as described in more detail in R. Kremann and P. V. Reininghaus, *Z. Metallkunde*, vol 12, p273 (1920) which is hereby incorporated by reference.

The anode of this invention may also include other optional materials. For example, in the preferred embodiments of invention, the anode includes a one or more polymeric binders. In these preferred embodiments of the invention, the alloy is generally in particulate form, bonded together, and maintained in a composite structure by the binder. The use of the polymeric binders with the alloy in particulate form, provides for a large surface area for the sodium alloy to contact with the electrolyte media when the anode is placed in the battery electrolyte solution. Polymeric binders which are useful in the practice of this invention are those which form porous substrates to allow for contact between the particulate alloy and the electrolyte, and which hold the alloy in the composite during the charging and discharging of the cell. These functions can be provided by a single binder or a mixture of binders can be used each of which possess one or more of the desirable characteristics. Illustrative of such binders are polyphenylene, and other conjugated backbone polymers such as polythiophene, polyacetylene and the like, and nonconjugated backbone polymers, as for example polyacrylates, polymethacrylates, polyvinyls polyethylene and polypropylene. An especially useful polymer binder is polyphenylene because it swells and also becomes conductive when doped with sodium cations, in combination with polyethylene or polypropylene. However, other materials can be used as binders, provided they are porous to allow for contact between the electrolyte and the alloy and allow the alloy maintains a good electrical continuity within the anode structure, and they maintain the alloy in the composite during the charging and discharging of the cell. When swellable and dopable polymers such as polyphenylene (PPP) are used, alloys having higher sodium content are employed due to the fact that such polymers will absorb sodium from the alloy. Higher sodium content may not be needed when the swellable polymer does not take sodium from the alloy.

The amount of binder used in the preferred embodiments of the invention is not critical and can vary widely. Usually the amount of binder is not greater than about 40 weight percent based on the total weight percent based on the total weight of alloy and binder, and preferably from about 10 to about 30 weight percent on the aforementioned basis.

The organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired sodium metal salt and providing ionic conductiviities equal to or in excess of $10^{-4}$ S/cm. Examples of such useful organic solvents include propylene carbonate, ethylene carbonate, sulfolane, methyl sulfolane, dimethyl sulfolane, 3-methyl-2-oxazolidone, alkane sultones, e.g., propane soltone; butane sultone (the use of soltones as electrolyte compositions is the subject of a related, commonly-assigned U.S. patent application Ser. No. 556,717, and the use of sultones for coatings on polymer anodes is the subject of a related, commonly-assigned U.S. Pat. No. 4,472,489), dimethyl sulfoxide (DMSO), dimethyl sulfite, tetrahydrofuran (THF), 2-methyltetrahydrofuran (2-MTHF), dioxane, dioxolane, 1,2-dimethoxyethane (DME), dimethoxymethane, diglymes, glymes, anisole, nitriles, (e.g., proprionitrile, butyronitrile, acetonitrile, benzonitrile), dichloromethane, tetraethylsulfamide, aromatic hydrocarbons, e.g., toluene, benzene, organo phosphorus compounds, e.g., hexamehtylene and trimethyl phosphate. Mixtures of such available organic solvents may also be used, such as mixtures of propylene carbonate and dimethoxythane.

The organic solvents chosen for use in any particular situation will, of course, depend upon many factors such as the precise electrolyte composition used and the voltage range desired, as well as the choice of cathode and other components of the battery used. In the preferred embodiments of the invention ether-type solvents such as tetrahydrofuran, dimethoxyethane, diglyme, 2-methyltetrahydrofuran and mixtures thereof are employed.

Salts for use in the electrolyte of the battery of this invention are of the formula:

NaA wherein:

Na is sodium; and

A is a species which is anionic in the electrolyte and stable under operational conditions. Suitable anionic species include $I^-$, $Br^-$, $Cl^-$, $PF_6^-$, $AsF_6^-$, $SO_3CF_3^-$, $BF_4^-$, $BCl_4^-$, $AlCl_4^-$, alkylborates, such as $B(CH_3)_4$, arylborates, such as $B(C_6H_5)_4^-$ (benzoate), $CH_3C_6H_4SO_3^-$ (tosylate), $SiF_6^-$, $HSO_4^-$ and the like. Preferred anions are alkylborates, arylborates, or alkylarylborates, $PF_6^-$, and particularly preferred anions are alkylborates, arylborates, $ClO_4^-$, alkylarylborates and $PF_6^-$.

Molten salts may also be employed as the electrolyte of the battery of the invention. Room temperature molten salts suitable for use in batteries of this invention include alkali metal halide-trialkylimidazolium chloroaluminate, alkali metal halide-dialkylimidazolium chloroaluminate, and alkali metal halide alkyl pyridinium chloroaluminate. Since in many cases the polymers, alloys and other ion inserting materials of this invention are stable at elevated temperature, intermediate temperature molten salts (M.P. <200° C.) such as $MaAlCl_4$ or $KAlCl_4$, are also suitable for use.

Cathodes for use in the practice of this invention are not critical and can be varied widely. Suitable cathodes include a material selected from the group consisting of graphite, intercalation compounds of graphite, high surface area carbons (>200 $M^2/g$), transition-metal chalcogenides, metal oxides, and conjugated backbone polymers which are capable of being oxidized (acceptor-doped). Transition-metal chalcogenides, metal oxides and conjugated backbone polymers are preferred cathode materials.

The transition-metal chalcogenides, suitable as cathode materials useful in this invention, can contain inserted alkali metals and include the transition-metal dichalcogenides such as $TiS_2$ and, among others, those listed on page 392 of "Lithium Batteries" edited by J. P. Gabano (Academic Press, 1983) and in K. M. Abraham, Solid State Ionics, Vol. 7, pp. 199–212 (1982) both incorporated herein by reference). These include (with aproximate open circuit potentials measured in various organic electrolytes when fully charged or devoid of inserted cations.

| | |
|---|---|
| $Na_xTiS_2$ | 2.1 V versus $Na/Na^+$ |
| $Na_xNbS_2Cl_2$ | 2.2 V versus $Na/Na^+$ |
| $Li_xMoX_2$ | 2.3 V versus $Li/Li^+$ |
| $Li_xFe_{0.25}V_{0.75}S_2$ | 2.4 V versus $Li/Li^+$ |
| $Li_xTiS_2$ | 2.5 V versus $Li/Li^+$ |
| $Li_xMoS_3$(amorphous) | 2.5 V versus $Li/Li^+$ |
| $Na_xWO_{3-y}$ | 2.6 V versus $Na/Na^+$ |
| $NaMoS_3$(amorphous) | 2.7 V versus $Na/Na^+$ |
| $Na_xTaS_2$ | 2.7 V versus $Na/Na^+$ |
| $Li_xMoO_3$ | 2.8 V versus $Li/Li^+$ |
| $Li_xV_6O_{13}$ | 2.9 V versus $Li/Li^+$ |
| $Li_xCr_{0.5}V_{0.5}S_2$ | 2.9 V versus $Li/Li^+$ |
| $Li_xW_{0.2}C_{2.8}O_7$ | 3.0 V versus $Li/Li^+$ |
| $Li_xCr_3O_8$ | 3.6 V versus $Li/Li^+$ |
| $Na_xCoO_2$ | 3.7 V versus $Na/Na^+$ |

| | |
|---|---|
| $Li_xCoO_2$ | 4.7 V versus $Li/Li^+$ |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene and substituted verisons of the above. Such polymers may be coated by reaction, when oxidized, with pyrroles, thiophenes, azulenes, oxiranes, anilines or furans, as described in commonly assigned U.S. Pat. No. 4,472,987, the disclosure of which is incorporated herein by reference.

The secondary battery of this invention can be charged and discharged in accordance with the procedure described in U.S. Pat. No. 4,602,492. Such procedures are well known to those of skill in the art and will not be described herein in any great detail.

The following specific examples are presented to more particularly illustrate the invention and are not to be construed as limitations therein.

EXAMPLE I

To prepare Na-Pb alloy metallurgically, proper amounts of Na and Pb were placed in a stainless steel container and heated at a temperature about 510±10° C. in inert atmosphere or under vacuum for a few hours and then quenched to room temperatures. the alloy was then pulverized before use. Na—Pb alloy of the following composition $NaPb_3$, $Na_5Pb_2$ and $Na_{15}Pb_4$ were prepared using the method described as above. Their electrochemical potentials relative to Na were measured using electrometer in the appropriate electrolyte solutions containing sodium ions and listed in Table 1 as follows:

TABLE 1

| Composition | Potential (vs $Na/Na+$), V |
|---|---|
| $NaPb_3$ | 0.51 |
| NaPb | 0.37 |
| $Na_5Pb_2$ | 0.183 |
| $Na_{15}Pb_4$ | 0.12 |

EXAMPLE II

Metallurgically formed Na—Pb alloy powder of the composition $Na_{15}Pb_4$ (32 mg) was pressed onto the expanded nickel metal and used as an electrode. The potential of this electrode was measured while stripping 83% of the Na in the $Na_{15}Pb_4$ alloy away from the electrode. The potential vs the amount of sodium stripped from the electrode was plotted. Several potential plateaus were observed from the plot. This indicated that $Na_{15}Pb_4$ and other binary alloys formed during the stripping procedure corresponded well with the potentials measure in Example 1 and with their respective compositions. Less than 100% Na stripping from the alloy was due to the loss alloy resulted from the volume change.

EXAMPLE III

Sodium alloy can also be formed elecrochemically by plating Na onto Pb foil. By plating Na on Pb foil at a current density of 50 microamp/cm², Na—Pb alloy of various compositions were shown as several potential plateaus. The potential of these plateaus: 0.5, 0.34, 0.17 and 0.12 V corresponded well with the values measured in Example 1.

EXAMPLE IV

Na ternary alloy containing Pb and Sn was prepared by heating the proper amounts of Na, Pb and Sn in a stainless steel crucible in an inert atmosphere or under vacuum at a temperature about 510±10° C. for few hours and then quenching to room temperatures. The resulting ternary alloy had the following composition $NaPb_{0.26}Sn_{0.74}$ and a potential of 0.25 vs $Na/Na+$.

EXAMPLE V

A Na alloy electrode was prepared by mixing the $NaPb_{0.26}Sn_{0.74}$ alloy of Example IV in powdered form with 10 weight percent of polyphenylene (PPP) and 10 weight percent of polypropylene binder. The mixture was then pressed onto expanded nickel metal and heated at 160° C. for 10 to 20 minutes under vacuum or in an inert atmosphere.

A cell was constructed which consisted of the anode (68 mg on an area of 0.6×2.4 cm²) whose preparation is described above and a $Na_xCoO_2$ cathode was assembled using glass filter paper to separate the two elelctrodes. The electrolyte solution used was 1.25M $NaPF_6$ in DME. Before cycling, 3.77 mAh capacity was added to the anode. This amount of charge was obtained by charging the $Na_xCoO_2$ cathode and plating sodium from the auxilliary sodium electrode. The final potential of this electrode was about 0.10 V.

The cell was then cycled at a rate of 0.5 mA/cm² in the voltage range of 3.2 to 2.2 V ($Na_xCoO_2$ vs alloy anode) for 22 cycles. The cell was further cycled at a rate of 1.0 mA/cm² in the same voltage range from the 23rd to the 87th cycle. The potential profile of the anode (vs $Na/Na+$) vs capacity at selected cycles was plotted. The plot indicated that the discharge capacity of the cell decreased from 4.39 mAh at the first cycle to 3.59 mAh at the 21st cycle, 3.35 mAh at the 24th cycle, 3.07 mAh at the 50th cycle and 2.84 mAh at the 87th cycle. The coulombic efficiency of each cycle was varied from 97 to 99%.

What is claimed is:

1. A secondary battery comprising:
   (a) an anode which comprises an alloy of sodium and one or more metals selected from the group consisting of tin, lead, antimony, bismuth, selenium and tellerium,
   (b) an electrolyte comprising one or more organic solvents and one or more sodium salts dissolved therein forming dissolved sodium cations in solution; and
   (c) a cathode;
   said sodium cations from said electrolyte alloying with said one or more metals of said alloy in said anode during the charging of said battery and sodium in said alloy dissolving in said electrolyte during the discharging of said battery.

2. A battery according to claim 1 wherein said alloys and selected from the group consisting of ternary or binary alloys of sodium and one or two metals selected from the group consisting of tin, lead, bismuth, and antimony.

3. A battery according to claim 2 wherein said alloy is a binary alloy of sodium and lead, or sodium and tin, or a ternary alloy of sodium, tin and lead.

4. A secondary battery comprising:

(a) an anode which comprises a ternery alloy of sodium and one or more other metallic or non-metallic materials;
(b) an electrolyte comprising one or more organic solvents and one or more sodium salts dissolved therein forming dissolved sodium cations in solution; and
(c) a cathode;
said sodium cations from said electrolyte alloying with said materials of said alloy in said anode during the charging of said battery and sodium in said alloy dissolving in said electrolyte during the discharging of said battery.

5. A battery according to claim 4 wherein said alloy is a ternary alloy of sodium, tin and lead.

6. A secondary battery comprising:
(a) an anode which comprises an alloy of sodium and one or more other metallic or non-metallic materials wherein said alloy contains the maximum amount of sodium which can be alloyed with said other components before pure metallic unalloyed sodium is formed;
(b) an anode which comprises a ternery alloy of sodium and one or more other metallic or non-metallic materials;
(c) an electrolyte comprising one or more organic solvents and one or more sodium salts dissolved therein forming dissolved sodium cations in solution; and
(d) a cathode;
said sodium cations from said electrolyte alloying with said materials or components of said alloy in said anode during the charging of said battery and sodium in said alloy dissolving in said electrolyte during the discharging of said battery.

7. A battery according to claim 6 wherein the mole ratio of sodium to the other components is at least about 1 to 1.

8. A battery according to claim 7 wherein said mole ratio is from about 1 to 1, to about 5 to 1.

9. A battery according to claim 8 wherein said mole ratio is from about 1 to 1 to about 4.5 to 1.

10. A secondary battery comprising:
(a) an anode which comprises an alloy of sodium and one or more other metallic or non-metallic materials in particulate form dispersed in one or more polymeric binders at least one of said binders being swellable by a battery electrolyte allowing electrical continuity between all or a part of the dispersed alloy, wherein said binders are polyphenylene in combination with polyethylene or polypropylene;
(b) an electrolyte comprising one or more organic solvents and one or more sodium salts dissolved therein forming dissolved sodium cations in solution; and
(c) a cathode;
said sodium cations from said electrolyte alloying with said materials of said alloy in said anode during the charging of said battery and sodium in said alloy dissolving in said electrolyte during the discharging of said battery.

* * * * *